(12) United States Patent
Maher et al.

(10) Patent No.: US 6,723,673 B2
(45) Date of Patent: Apr. 20, 2004

(54) HIGH DIELECTRIC CONSTANT VERY LOW FIRED X7R CERAMIC CAPACITOR, AND POWDER FOR MAKING

(75) Inventors: Galeb H. Maher, Williamstown, MA (US); Samir Maher, Williamstown, MA (US); James M. Wilson, North Adams, MA (US)

(73) Assignee: MRA Laboratories, Inc., Adams, MA (US)

( * ) Notice: Subject to any disclaimer, the term of this patent is extended or adjusted under 35 U.S.C. 154(b) by 0 days.

(21) Appl. No.: 10/409,808

(22) Filed: Apr. 9, 2003

(65) Prior Publication Data

US 2003/0203805 A1 Oct. 30, 2003

Related U.S. Application Data

(63) Continuation-in-part of application No. 10/036,205, filed on Oct. 29, 2001, which is a continuation-in-part of application No. 09/652,562, filed on Aug. 31, 2000, now Pat. No. 6,309,995.

(51) Int. Cl.$^7$ .................. C04B 35/468; H01G 4/10; H01G 4/30
(52) U.S. Cl. .................. 501/138; 501/139; 264/605; 264/615; 361/301.4; 361/321.3; 361/321.4; 361/321.5
(58) Field of Search .................. 501/139, 138; 264/605, 615; 361/301.4, 321.3, 321.4, 321.5

(56) References Cited

U.S. PATENT DOCUMENTS

| | | | | |
|---|---|---|---|---|
| 5,219,812 A | * | 6/1993 | Doi et al. .................. | 501/138 |
| 5,453,409 A | * | 9/1995 | Kishi et al. .................. | 501/139 |
| 5,650,367 A | * | 7/1997 | Fujikawa et al. .................. | 501/139 |
| 6,544,916 B1 | * | 4/2003 | Sato et al. .................. | 501/137 |

* cited by examiner

*Primary Examiner*—David Brunsman
(74) *Attorney, Agent, or Firm*—Malcolm J. Chisholm, Jr.

(57) ABSTRACT

The invention includes a dielectric ceramic powder mixture comprising at least ninety weight percent essentially pure barium titanate powder having an average particle size of from 0.2 to 1.2 microns; from 0.2 to 2.5 weight percent of barium lithium borosilicate flux; from 0.1 to 0.3 weight percent of $MnCO_3$; a grain growth inhibitor such as niobium oxide or other niobate compound; and, 0.4 to 1.2 weight percent of an additive selected from the group consisting of a rare earth oxide, yttrium oxide, a combination of rare earth oxides, and a combination of yttrium oxide and rare earth oxides, such that ions of the additive(s) have an average ionic radius of about 0.97 angstroms. The dielectric ceramic powder provides a start powder for making very low firing multilayer ceramic capacitors satisfying X7R performance requirements.

20 Claims, 1 Drawing Sheet

FIG. 1

HIGH DIELECTRIC CONSTANT VERY LOW FIRED X7R CERAMIC CAPACITOR, AND POWDER FOR MAKING

CROSS REFERENCE TO RELATED APPLICATION

This Application is a continuation-in-part of Applicant's U.S. patent application Ser. No. 10/036,205 filed on Oct. 29, 2001 which is a cip of Ser. No. 09/652,562 filed on Aug. 31, 2000, now U.S. Pat. No. 6,329,995.

FIELD OF THE INVENTION

This invention relates to multilayer ceramic capacitors and formulated ceramic powders for making capacitors that meet X7R performance characteristics of the Electronic Industries Alliance ("E.I.A."), and in particular relates to a formulated ceramic powder from which there can be made a dielectric ceramic body that can be sintered at or below 1,025° C. to permit the usage of a high silver content silver-palladium alloy electrode having an 85 weight percent or greater silver composition.

BACKGROUND OF THE INVENTION

Efforts to produce low fired, high dielectric constant, X7R multilayer ceramic capacitors and formulated ceramic powder for making the capacitors are well known. For example, dielectric ceramic compositions that lead to a mature dielectric body with standard X7R performance characteristics and a high dielectric constant after firing or sintering at about 1,100° C. are disclosed in several patents by one of the present inventors, Galeb Maher. Those patents include U.S. Pat. No. 5,010,443 that issued on Apr. 23, 1991 to Maher, U.S. Pat. No. 5,258,338 that issued on Nov. 2, 1993 to Maher, and U.S. Pat. No. 6,043,174 that issued on Mar. 28, 2000 to Maher et al., all of which patents are hereby incorporated herein by reference and all of which are assigned to the same assignee that is also the assignee of all rights in the present invention disclosed and claimed herein.

In the aforesaid U.S. Pat. No. 6,043,174 to Maher et al., a highly acceptable X7R formulated ceramic powder mixture is described that may be sintered after formulation at a temperature as low as 1,120° C. in order to permit usage of electrodes consisting of 70% silver and 30% palladium. The ceramic powder mixture disclosed in the U.S. Pat. No. 6,043,174 Patent comprises at least ninety weight percent ("wt %") pure barium titanate powder having an average particle size of from 0.4 to 0.7 microns, from 1.5 to 2.5 wt % of a cadmium silicate powder flux, a small amount of a grain growth inhibitor compound, such as 0.89 to 2.72 mole percent $Nb_2O_5$, and also about 0.2 to 1.0 mole percent calcium carbonate relative to the amount of barium titanate. Multilayer ceramic capacitors made from such a composition are currently being made and sold in the industry, and formulated ceramic powders made according to the disclosures in U.S. Pat. No. 6,043,174 are being sold by the assignee of the present invention, MRA Laboratories, Inc., of Adams, Mass., U.S.A.

Such ceramic powders and multilayer ceramic capacitors made from those powders have achieved high performance characteristics while reducing the amount of palladium within an electrode. As is well known, the high cost of palladium has made it desirable to decrease the amount of palladium and to increase the amount of silver in a silver-palladium alloy electrode. By decreasing the sintering temperature at which the ceramic powder is converted from a powder into a cohesive solid or mature body without melting the powder, the relative amount of silver in the silver-palladium electrode may be increased while the amount of palladium may be decreased. As indicated above, the ceramic powders disclosed in the U.S Pat. No. 6,043,174 Patent enabled sintering at a temperature of between 1,120° C. to 1,150° C. so that the amount of palladium in the electrodes could be reduced to 30 percent. It is understood in the art that the sintering temperature of the ceramic powder must be below the melting temperature of the silver-palladium electrode. Additionally, as the proportion of silver in the electrode is increased and the proportion of palladium in the electrode is decreased, the melting temperature of the electrode is decreased. Therefore, by lowering the sintering temperature of the ceramic powder, a greater proportion of silver and smaller proportion of palladium may be utilized in making the electrode to effect a significant cost saving due to the substantially higher cost of palladium compared to the cost of silver.

The aforesaid Patents also disclose further research efforts of the inventors herein to decrease costs and enhance performance characteristics of formulated ceramic powders for multilayer capacitors. For example, U.S. Pat. No. 6,043,174 also discloses that by an addition of a very small and critical quantity of a calcium compound such as calcium carbonate or calcium niobate to the start powder, a costly anneal step may be eliminated while maintaining a high insulation resistance in an accelerated life test with only a very small reduction of dielectric constant.

While known formulated ceramic powders and multilayer capacitors made from the powders demonstrate improved performance, nonetheless, existing powders still suffer from significant limitations. For example, it is known to use heavy metal oxides such as CdO in the powders as a flux. The advantages of use of cadmium silicate flux in multilayer capacitors were first disclosed by one of the inventors herein in U.S. Pat. No. 4,266,265 that issued on May 5, 1981 to Galeb Maher. However, such heavy metal compounds as cadmium oxide are increasingly considered hazardous materials, and hence they pose significant cost problems related to usage and disposal of components utilizing capacitors that include cadmium or other hazardous heavy metals. Additionally, as disclosed in the aforesaid patents, in sintering ceramic powders that include a cadmium silicate flux, a closed crucible must be used to contain any toxic cadmium fumes from contaminating persons in the vicinity of the crucible.

Accordingly, there is a need for a multilayer ceramic capacitor and powder for making the capacitor that does not include hazardous heavy metals, and that reduces costs of known capacitors.

SUMMARY OF THE INVENTION

The invention includes a dielectric ceramic powder mixture comprising at least ninety weight percent essentially pure barium titanate powder having an average particle size of from 0.2 to 1.2 microns; from 0.2 to 2.5 weight percent of barium lithium borosilicate ("BLBS") flux; from 0.05 to 0.3 weight percent of $MnCO_3$; from about 0.01 to 0.25 weight percent $Co_3O_4$; a grain growth inhibitor such as niobium oxide or a niobate compound yielding 0.4 to 1.50 weight percent $Nb_2O_5$; and, 0.4 to 1.4 weight percent of an additive selected from the group consisting of a rare earth oxide, a combination of rare earth oxides, yttrium oxide, or a combination of rare earth oxides and yttrium oxide, such that rare earth ions of the rare earth oxide have an average ionic radius of about 0.97 angstroms ("A°"), rare earth ions of the combination of rare earth oxides have an average ionic radius of about 0.97 angstroms ("A°"), yttrium ions of the yttrium oxide have an average ionic radius of about 0.97 angstroms ("A°"), or ions of a combination of rare earth oxides and yttrium oxide have an average ionic radius of "about 0.97 A°". The determination of an "average ionic radius" being "about 0.97 A°" is based upon ionic radii measurements known in the art according to "Ahrens". (See, Ahrens, L. H. (1952), Geochim. Cosmochim. Acta 2., Pages 155–169. (Hereinafter, "Ahrens".)) (For purposes herein, the phrase "about" a measurement, such as "about 0.97 A°" includes plus or minus 20%, such as 0.97 A° plus or minus 20%.

In the aforesaid U.S. patent application Ser. No. 10/036, 205 some of the inventors of the present invention found that the rare earth oxide additive of gadolinium provided unexpectedly and highly desirable results in yielding a fine grain structure, and that when combined with $Nb_2O_5$ or a niobate compound as a grain growth inhibitor, a desirable core-shell structure known in the art was obtained that demonstrates excellent X7R performance characteristics after firing or sintering at temperatures as low as 875° C. The rare earth oxide that demonstrated such desirable results is $Gd_2O_3$. The two gadolinium ions having a charge of plus 3 ("$Gd^{+3}$") that combine with the three oxygen ions to form $Gd_2O_3$ (gadolinium oxide) each have a radius of about 0.97 A°. However, subsequent research has determined that additives including combinations of rare earth oxides also produce similar desirable results, provided the average ionic radius of the rare earth ions having a plus 3 charge is about 0.97 A°. Additionally, it has been found that yttrium oxide as an additive also promotes excellent performance characteristics, and the ionic radius of yttrium ions is within plus or minus 20% of 0.97 A°.

For example, a combination of 66% dysprosium oxide ($Dy_2O_3$) and 34% neodymium oxide ($Nd_2O_3$) produces an average ionic radius of the plus 3 charged rare earth ions of about 0.97 A°. The ionic radius of Dy+3 is 0.92, and the ionic radius of Nd+3 is 1.04, so that for a combination of 66% Dy+3 and 34% Nd+3, the average ionic radius of the plus 3 rare earth ions is about 0.97 A°.

Additional research provided further improvements in the dielectric ceramic powder by providing an enhanced range of weight percentages for BLBS flux of about 1 wt %; by showing that optimal performance of the BLBS flux may be obtained by adjusting the content of lithium silicate to about 50 molar percent of the BLBS; by demonstrating that addition of between 0.1 to 0.3 wt % of silver or between 0.1 to 0.3 wt % of copper also improved performance; by demonstrating substitution of a molar equivalent of tantalum oxide for the niobium oxide also provided adequate performance of the powder; and, by establishing that a partial substitution of the $MnCO_3$ with between 0.1 to 0.2 wt % $Co_3O_4$ also provides for enhanced performance of the ceramic powder.

An additional aspect of the invention includes a method of making the above described preferred dielectric ceramic powder. Although good ceramic capacitors have been made by simply batching all the non-barium titanate minor additives with barium titanate during preparation of a capacitor paint slurry, further improvements in the properties and lowering of the sintering temperature were achieved when all the minor additives are mixed separately and pre-reacted at relatively low temperature. Preparation of the ceramic powder by this enhanced pre-reacting method includes the steps of: intensively wet milling the minor additives including $Nb_2O_5$, the described rare earth oxides, BLBS flux, Ag, $MnCO_3$ and $Co_3O_4$ to achieve a particle size below 1.0 micron and preferably around 0.5 to 0.6 microns; drying the wet milled minor additives at about 150° C.; then, granulating and mildly calcining the dried, wet milled mixture of minor additives at about 500 to 600° C.; then mixing the calcined minor additives with the barium titanate. It has been discovered that this method of making the enhanced ceramic powder provides for a powder with improved performance characteristics because complex intermediate phases are formed by the described pre-reacting process.

Another aspect of this invention includes a method for making a multilayer ceramic capacitor body that satisfies X7R performance characteristics that includes the steps of forming a slurry of the above described dielectric ceramic start powder mixture by a dispersion of the mixture in a binder-solvent-dispersion system; preparing layers of the slurry; drying the layers; forming a stack of a plurality of the layers and interleaving patterned films of silver-palladium electrode ink between successive adjacent pairs of layers; and then heating to mature the stack of layers by sintering in open air at a temperature of between 875° C. to 1,025° C. for between 3 to 5 hours to produce a dense ceramic capacitor body with buried electrodes.

The multilayer ceramic capacitor made by that method demonstrates the aforesaid favorable X7R performance characteristics of dielectric constant ("K") greater than 2,500, a smooth temperature coefficient of capacitance ("TCC") wherein the K will be within +/−15% between −55° C. to 125° C., a dissipation factor ("DF") of less than 2.5 percent, an insulation resistance greater than 100 ohm-farads at 125° C., and long term stability during a life test at elevated temperatures and voltages.

It is therefore a purpose of this invention to provide a very low fired, high dielectric constant ceramic capacitor and the powder for making the capacitor that includes a gadolinium oxide or other rare earth oxide, or combination of rare earth oxides, or yttrium oxide, or a combination of yttrium oxide and rare earth oxides, as an additive that also includes no heavy metals. The resulting powder and ceramic capacitor has smooth X7R performance characteristics, may be fired or sintered at temperatures between 875° C. to 1,025° C., and includes no hazardous waste products, thereby minimizing manufacture and disposal costs, while permitting usage of a high silver content silver-palladium electrode having a sliver content in excess of 85 percent.

These and other objects and advantages of this invention will become more readily apparent when the following description is read in conjunction with the accompanying drawing.

DETAILED DESCRIPTION OF THE PREFERRED EMBODIMENTS

Figure 1:
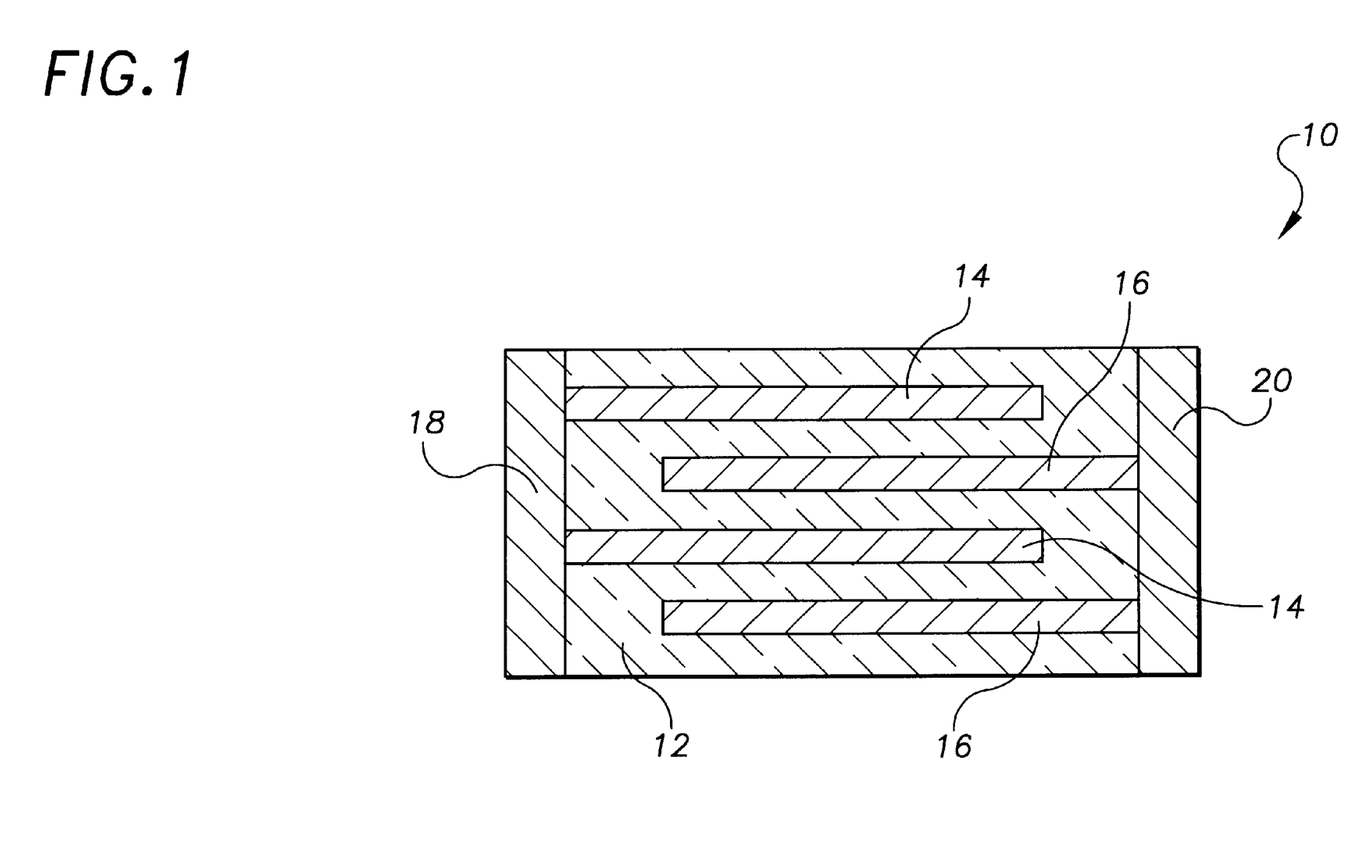
FIG. 1 is a cross-sectional, simplified view of a multilayer ceramic capacitor constructed in accordance with the present invention.

The preferred embodiments of a ceramic powder mixture resulted from extensive experimentation that will be described herein. The preferred ceramic powder formulations were developed by testing the examples described below in the form of both experimental monolayer structures and multilayer capacitor ("MLC") structures, as shown in the tables below. A simplified, schematic multilayer ceramic capacitor is shown in FIG. 1, and is generally designated by the reference numeral 10. The capacitor 10 includes a ceramic body 12, a first group or plurality of electrodes 14 buried within the body 12, a second group or plurality of electrodes 16 buried in the body 12 in capacitive relationship with the first plurality of electrodes 14, a first external terminal 18 connected to the first group of electrodes 14, and a second external electrode 20 connected to the second group of electrodes 16.

The following tables of examples show the effect of various additives or processes on the fired density, dielectric constant, dissipation factor and TCC in a monolayer disc type specimen (1 cm in diameter and 0.1 cm in thickness) and in a MLC structure of 0805 chip size (2.03 mm×1.27 mm), as further described in the table headings.

$Dy_2O_3/Nd_2O_3$ in experiment 02-182D; where experiment 02-182E shows 0.8 wt % $Gd_2O_3$.

Although $Gd_2O_3$ appeared to give good physical and electrical properties over a wider range of compositions, it was also discovered that one or more other rare earth oxides where the average combination of their ionic radius will be nearly similar to that of $Nd^{3+}+Dy^{3+}$, namely about 0.97 A°, gave nearly similar properties to that composition with $Gd_2O_3$ only. That can be seen by comparing examples 02-182E and 02-182D.

Replacement of $Gd_2O_3$ by an equi-molar amount of $Ho_2O_3$ also gave good properties with the exception of the TCC being slightly more negative at −55° C. (See Example 02-182A.) Partial substitution of $Gd_2O_3$ by $Dy_2O_3$ also appeared to give useful compositions, as shown in Example 02-182C. Example 02-182B shows that substitution with yttrium oxide ($Y_2O_3$) also gives acceptable performance.

TABLE 1

Effect of: REO and Yttrium Oxide Substitutions for Gadolinium Oxide
Base Additive Composition wt %: 1 $Nb_2O_5$, 1 Flux, 0.1 $MnCO_3$, 0.1 $Co_3O_4$
Fired at: 950° C./5 Hrs.

| Experiment | $BaTiO_3$ wt % | REO wt % | Density g/cm³ | Grain Size um | K | % D.F. | TCC (%) −55 C. | −15 C. | 85 C. | 105 C. | 125 C. | Comments |
|---|---|---|---|---|---|---|---|---|---|---|---|---|
| 02-182A | 96.97 | 0.83 | 5.81 | <1 μm | 2840 | 0.81 | −19.1 | −11.8 | 2.7 | −2 | 0.9 | Equi-molar replacement of $Gd_2O_3$ by $Ho_2O_3$ |
| 02-182B | 97.11 | 0.12/0.57 | 5.82 | " | 2700 | 0.61 | −12.2 | −10 | −4.6 | −5.8 | −0.1 | 25 mole % of $Gd_2O_3$ addition replaced by $Y_2O_3$ |
| 02-182C | 97.02 | 0.21/0.57 | 5.81 | " | 2600 | 0.56 | −9.8 | −6.1 | −5 | −5.3 | 1.5 | 25 mole % of $Gd_2O_3$ addition replaced by $Dy_2O_3$ |
| 02-182D | 97.01 | 0.54/0.25 | 5.83 | " | 2500 | 0.52 | −6.4 | −4.2 | −5.3 | −4.8 | 3.0 | 66/34 wt. ratio of $Dy_2O_3$/$Nd_2O_3$ replacing $Gd_2O_3$ on a molar basis |
| 02-182E | 97.0 | 0.8 | 5.82 | " | 2600 | 0.53 | −7.6 | −4.8 | −6.1 | −6.2 | 0.6 | $Gd_2O_3$ |

Table 1 shows the effect of substitution or replacement of the rare earth oxide $Gd_2O_3$ by an equi-molar amount of Holmium ("Ho") in experiment 02-182A; by replacement of 25 mole % of the $Gd_2O_3$ with Yttrium ("Y") as $Y_2O_3$ in experiment 02-182B; by replacement of 25 mole % of the $Gd_2O_3$ with Dysprosium ("Dy") as $Dy_2O_3$ in experiment 02-182C; by a replacement of all of the $Gd_2O_3$ with a 66/34 wt. ratio of dysprosium oxide and neodymium oxide as These favorable results were also demonstrated with a MLC, as shown in Table 2, wherein other pertinent dielectric properties such as dielectric breakdown voltage, insulation resistance (I.R.) and stability of I.R. at elevated voltage temperature (accelerated life test) were also determined. In most MLC cases in the following Tables, the MLC samples consisted of 0805 chip size (2.03×1.27 mm) with 10.5 or 22.5 active layers at about 16 to 20 microns in fired layer thickness.

TABLE 2

REO and Yttrium Oxide Substitutions for $Gd_2O_3$
Base Additive Composition in w %: 1.0 $Nb_2O_5$, 1.0 Flux, 0.1 $MnCO_3$
MLC Structure: 0805 chip size, 10.5 layers, 18 micron dielectric thickness

| Sample | $BaTiO_3$ wt % | Firing Conditions | Ag/Pd Internal Electrode | Density g/cm³ | K | % D.F. | Dielectric Breakdown V/mil | TCC % −55 C. | 85 C. | 125 C. | IR (R × C Product) 150 V, 125 C. 24 Hrs. | 100 Hrs. | Comments |
|---|---|---|---|---|---|---|---|---|---|---|---|---|---|
| LT-1097 | 96.97 | 965° C. | 90/10 | 5.68 | 3415 | 1.88 | 2700 | — | −3.2 | −9.3 | 165 | 1650 | 0.1% $Co_3O_4$, 0.83 $Ho_2O_3$ |

TABLE 2-continued

REO and Yttrium Oxide Substitutions for Gd$_2$O$_3$
Base Additive Composition in w %: 1.0 Nb$_2$O$_5$, 1.0 Flux, 0.1 MnCO$_3$
MLC Structure: 0805 chip size, 10.5 layers, 18 micron dielectric thickness

| Sample | BaTiO$_3$ wt % | Firing Conditions | Ag/Pd Internal Electrode | Density g/cm$^3$ | K | D.F. | Dielectric Breakdown V/mil | TCC % −55 C. | 85 C. | 125 C. | IR (R × C Product) 150 V, 125 C. 24 Hrs. | 100 Hrs. | Comments |
|---|---|---|---|---|---|---|---|---|---|---|---|---|---|
| LT-1114 | 96.91 | 965° C. | 90/10 | 5.83 | 3310 | 1.32 | 2600 | −7.8 | −7.9 | −8.8 | 825 | 825 | 0.54% Dy$_2$O$_3$, 0.25% Nd$_2$O$_3$, 0.1% Ag, 0.1% Co$_3$O$_4$ |
| LT-1098 | 97.01 | 965° C. | 90/10 | 5.8 | 3320 | 1.32 | 2800 | −7.5 | −8.7 | −9.4 | 550 | 550 | 0.54% Dy$_2$O$_3$, 0.25% Nd$_2$O$_3$, 0.1% Co$_3$O$_4$ |
| LT-1121 | 97.01 | 965° C. | 90/10 | 5.79 | 3420 | 1.48 | 2750 | −9.4 | −7.2 | −8.7 | 1650 | 1650 | 0.57% Gd$_2$O$_3$, 0.12% Y$_2$O$_3$, 0.1% Ag, 0.1% Co$_3$O$_4$ |
| LT-1129 | 97.0 | 965° C. | 90/10 | 5.77 | 3425 | 1.06 | 2700 | −1.4 | −6.4 | −1.5 | 825 | 825 | 0.6% Gd$_2$O$_3$, 0.2% Ho$_2$O$_3$, 0.1% Ag |
| LT-1151 | 96.9 | 950° C. | 90/10 | 5.76 | 3310 | 1.53 | 2900 | −8.8 | −8.5 | −8.9 | 825 | 825 | 0.6% Gd$_2$O$_3$, 0.2% Ho$_2$O$_3$, 0.1% Ag, 0.1% Co$_3$O$_4$ |
| LT-1137 | 96.9 | 950° C. | 95/5 | 5.80 | 3500 | 1.35 | 2500 | −6.9 | −8.8 | −9.4 | 825 | 825 | 0.1% Ho$_2$O$_3$, 0.8% Gd$_2$O$_3$, 0.1% Ag |
| LT-1138 | 96.8 | 950° C. | 95/5 | 5.87 | 3650 | 2.10 | 1500 | −8.5 | −7.4 | −13.3 | 330 | 110 | 0.2% Ho$_2$O$_3$, 0.8% Gd$_2$O$_3$, 0.1% Ag |
| LT-1138 | 96.8 | 925° C. | 95/5 | 5.83 | 3700 | 1.56 | 2650 | −6.2 | −9.5 | −9.3 | 330 | 110 | 0.2% Ho$_2$O$_3$, 0.8% Gd$_2$O$_3$, 0.1% Ag |

As seen in Table 2, equal molar substitution of Ho$_2$O$_3$ for Gd$_2$O$_3$ (example LT-1097) showed the highest I.R. but there was some evidence of slightly lower density and TCC near the X7R specification limit of +/−15%. Examples LT-1098 and LT-1114 showed the effect of substitution of Nd$_2$O$_3$/Dy$_2$O$_3$ with and without the Ag additive. Example LT-1121 showed the effect of partial substitution of Gd$_2$O$_3$ by Y$_2$O$_3$ with 0.1 wt % Ag. Example LT-1129 showed the effect of partial substitution of Ho$_2$O$_3$ for Gd$_2$O$_3$ with 0.1 wt % Ag, while example LT-1151 showed the effect of 0.1 wt % of Co$_3$O$_4$ addition as compared to example LT-1129.

Next, in Table 3, the effect of varying flux content of BLBS is shown.

TABLE 3

Effect of: Flux content
Base Additive Composition wt %: 1 Nb$_2$O$_5$, 0.8 Gd$_2$O$_3$, 0.1% MnCO$_3$, 0.1 Co$_3$O$_4$, 0.1 Ag
Fired at: 950° C./5 Hrs.

| Experiment | BaTiO$_3$ wt % | Flux wt % | Density g/cm$^3$ | Grain Size um | K | % D.F. | TCC (%) −55 C. | −15 C. | 85 C. | 105 C. | 125 C. |
|---|---|---|---|---|---|---|---|---|---|---|---|
| 03-13A | 97.4 | 0.5 | Porous | — | — | — | — | — | — | — | — |
| 03-13B | 97.15 | 0.75 | 5.74 | <1 μm | 2335 | 0.44 | −7.1 | −4.5 | −5 | −4.5 | 3 |
| 03-13C | 96.9 | 1.0 | 5.85 | " | 2445 | 0.5 | −8.9 | −5.5 | −5.9 | −6.4 | −0.7 |
| 03-13D | 96.65 | 1.25 | 5.93 | " | 2590 | 0.63 | −9.1 | −5.6 | −4.1 | −8.3 | −6.5 |
| 03-13E | 96.4 | 1.5 | 5.93 | " | 2745 | 0.83 | −13.7 | −7.9 | −1.3 | −12.1 | −16.8 |

TABLE 4A

Variation of Barium Borate-Lithium Silicate Ratios

| Sample | Sintering Temp. (C.) | Molar % Li$_4$SiO$_4$ | 3BaO.B$_2$O$_3$ | BaO.B$_2$O$_3$ | Weight % Li$_4$SiO$_4$ | 3BaO.B$_2$O$_3$ | BaO.B$_2$O$_3$ |
|---|---|---|---|---|---|---|---|
| 02-26A | 950 | 50 | 25 | 25 | 24.2 | 53.2 | 22.6 |
| 02-26B | 950 | 50 | 12.5 | 37.5 | 28.6 | 31.4 | 40 |
| 02-26C | 950 | 50 | 37.5 | 12.5 | 21 | 69.2 | 9.8 |
| 02-29A | 950 | 30 | 25 | 45 | 13.4 | 49.1 | 37.5 |

TABLE 4A-continued

Variation of Barium Borate-Lithium Silicate Ratios

| | | | | | | | |
|---|---|---|---|---|---|---|---|
| 02-29B | 950 | 30 | 45 | 25 | 11 | 72 | 17 |
| 02-38A | 950 | 70 | 25 | 5 | 37 | 58 | 5 |
| 02-38B | 950 | 70 | 5 | 25 | 50.6 | 15.8 | 33.6 |

| | Density | | | TCC (%) | | | | |
|---|---|---|---|---|---|---|---|---|
| Sample | g/cm³ | K | % DF | −55 C. | −15 C. | 85 C. | 105 C. | 125 C. |
| 02-26A | 5.76 | 2520 | 0.46 | −6.9 | −4.3 | −5.9 | −4.9 | 4.9 |
| 02-26B | 5.71 | 2475 | 0.5 | −11.3 | −6.9 | −6 | −6.6 | 1.2 |
| 02-26C | 5.75 | 2355 | 0.52 | −5.1 | −3.5 | −2.4 | 0.5 | 13.1 |
| 02-29A | Porous | — | — | — | — | — | — | — |
| 02-29B | Porous | — | — | — | — | — | — | — |
| 02-38A | 5.59 | 2330 | 0.58 | −10 | −6.4 | −5.5 | −5.9 | 1.6 |
| 02-38B | 5.72 | 2625 | 0.51 | −14.1 | −8.4 | −3.8 | −10.3 | −9.8 |

TABLE 4B

Effect of Substitution of Zinc Borate (70M % ZnO + 30M % B₂O₃) for Barium Borate in the BLBS (Flux)
Base Additive Composition in wt %: (1.0 Nb₂O₅, 0.25 MnCO₃) + χ (Flux)

| | | χ (Flux in w %) | | | | | | TCC (%) | | | |
|---|---|---|---|---|---|---|---|---|---|---|---|
| Sample | Sintering Temp. (C.) | BaTiO₃ wt. % | 0.7 (ZnO), 0.3 (B₂O₃) | Li₄SiO₄ | BLBS | Density g/cm³ | K | % DF | −55 C. | −15 C. | 85 C. | 105 C. | 125 C. |
| 02-199A | 950 | 97.99 | 0.52 | 0.24 | 0.0 | 5.57 | 2300 | 0.44 | −10.5 | −6.8 | −8.0 | −9.1 | −3.3 |
| 02-199B | 950 | 97.83 | 0.68 | 0.24 | 0.0 | 5.62 | 2310 | 046 | −8.4 | −5.7 | −7.6 | −8.9 | −4.0 |
| 02-126 | 950 | 97.75 | 0.0 | 0.0 | 1.0 | 5.74 | 2470 | 0.46 | −7.5 | −4.6 | −4.9 | −3.2 | 7.1 |

Table 3 shows testing of the BLBS flux in a wt % range from 0.5 wt % to 1.5 wt %. As seen in Example 03-13C, about 1 wt % of BLBS gave optimal high density and core shell structure when fired at 950° C.

Table 4A shows testing of the effect of varying a ratio of barium borate to lithium silicate in the BLBS flux. In Table 4A, Examples 02-26A to 02-38B show the effect of varying the content of lithium silicate in the BLBS in the range of 30 to 70 molar %. As can be seen in Example 02-26A, the 50% Li₄SiO₄, 25 molar % BaO.B₂O₃, 25 molar % 3Ba.OB₂O₃ appeared to give optimum properties.

Table 4B shows the effect of substitution of zinc borate (ZnO)₀.₇ (B₂O₃)₀.₃ for the barium borate (3BaO.B₂O₃+BaO.B₂O₃). As can be seen from examples 02-199A and 02-199B, useful electrical properties can be achieved, although with somewhat lower "K". The flux including the zinc borate will be hereinafter referred to as a "zinc lithium borosilicate flux", which may also be mixed with the BLBS. Example 02-126 which employs the BLBS flux can be used for comparison.

Although the BLBS flux composition is based on the system 0.25 (3BaO.B₂O₃) 0.25 (BaO.B₂O₃) 0.50 (Li₄SiO₄), the molar ratio of the basic oxides can also be presented as (BaO+0.5 B₂O₃+Li₂O+0.5 SiO₂) or in molar % of the oxides as 33.3 Li₂O, 33.3 BaO, 16.7 B₂O₃, 16.7 SiO₂. In formulating the BLBS flux, the following precursor materials can be used, such as BaCO₃, H₃BO₃, Li₂O₃ or BaO.B2O3.H2O or LiBO₃, or a combination of these or other suitable precursors.

It has been determined that the ranges of the oxides within the BLBS flux in mole % are as follows:

| | |
|---|---|
| BaO | 16.25 to 46.25 |
| Li₂O | 20.1 to 46.9 |
| B₂O₃ | 8.75 to 28.75 |
| SiO₂ | 9.9 to 23.1 |

The following flux components were used and gave nearly similar properties:
3BaO.B₂O₃+BaO.B₂O₃+Li₂SiO₃
BaCO₃+H₃BO₃+Li₂CO₃+SiO₂
BaO.B₂O₃.H₂O+BaCO₃+Li₂CO₃+SiO₂.

Next, in Table 5, tests of the effect of the addition of small amounts of acceptor ions such as silver, copper and and nickel are shown.

TABLE 5

Effect of: Ag, CuO, NiO Additions
Base Additive Composition w %: 1 $Nb_2O_5$, 1 Flux, 0.8 $Gd_2O_3$, 0.1 $MnCO_3$, 0.1 $Co_3O_4$
Fired at: 950° C./5 Hrs.

| Experiment | $BaTiO_3$ wt % | Ag wt % | CuO wt % | NiO wt % | Density g/cm³ | Grain Size um | K | % D.F. | TCC (%) -55 C. | -15 C. | 85 C. | 105 C. | 125 C. |
|---|---|---|---|---|---|---|---|---|---|---|---|---|---|
| 02-171D | 97.0 | 0 | 0 | 0 | 5.79 | <1 μm | 2480 | 0.53 | −9.1 | −5.3 | −6 | −6.3 | 0.1 |
| 02-171A | 96.9 | 0.1 | 0 | 0 | 5.85 | " | 2750 | 0.6 | −11.2 | −6.8 | −6.8 | −8.2 | −3 |
| 02-171B | 96.8 | 0.2 | 0 | 0 | 5.89 | " | 2760 | 0.6 | −11.5 | −7 | −6.9 | −8.8 | −4.4 |
| 02-171C | 96.7 | 0.3 | 0 | 0 | 5.88 | " | 2750 | 0.58 | −10.6 | −6.3 | −7.2 | −8.7 | −4 |
| 02-172A | 96.9 | 0 | 0.1 | 0 | 5.79 | " | 2540 | 0.52 | −10.8 | −7.1 | −7.3 | −9.2 | −5 |
| 02-172B | 96.8 | 0 | 0.2 | 0 | 5.80 | " | 2550 | 0.46 | −11.7 | −7.8 | −8.6 | −11 | −7.4 |
| 02-172C | 96.7 | 0 | 0.3 | 0 | 5.82 | " | 2540 | 0.47 | −12.6 | −8.7 | −8.8 | −11.6 | −8.5 |
| 02-185A | 96.9 | 0 | 0 | 0.1 | 5.75 | " | 2560 | 0.53 | −9.4 | −5.9 | −6.6 | −7.3 | −1.5 |
| 02-185B | 96.85 | 0 | 0 | 0.15 | 5.66 | " | 2560 | 0.62 | −11.2 | −7 | −9.1 | −10.5 | −5.7 |

Although silver (Ag) is a noble metal, it has been known to be incorporated in a small quantity in pervoskite structures such as $BaTiO_3$ and lanthanum modified lead zirconate titanate, for example as shown in U.S. Pat. Nos. 4,135,224 and 4,219,866. In this application where the internal electrodes of the MLC capacitor consisted of high silver content electrode and no Ag is purposely incorporated into the dielectric, it was observed that some of the Ag from the electrode had readily dissolved into the dielectric, thereby increasing the dielectric constant of the capacitor.

Examples 02-171A through 02-171D show that up to 0.3 wt % Ag relative to the total composition increased the fired density and the dielectric constant, without significant change in the TCC. It is believed that Ag+1 will likely go into the pervoskite structure on the Ba+2 lattice site. It is also believed that incorporating a small amount of Ag in the dielectric ceramic powder will significantly reduce the amount of silver that may diffuse out of the internal electrodes 14, 16 during sintering.

Examples 02-172A through 02-172C show the effect of copper oxide additions. Good properties are achieved, but slightly lower "K" is also observed. On the other hand, the addition of NiO, as shown in Examples 02-185A and 02-185B in excess of 0.1 w %, reduced the density significantly.

In Table 6, the effect of a partial substitution of $MnCO_3$ by $Co_3O_4$ is shown.

TABLE 6

Effect of $MnCO_3$—$Co_3O_4$ Additive
Base Additive Composition in w %: 0.3 $Gd_2O_3$, 1 Flux, 1 $Nb_2O_5$
Internal Electrode: 90/10
MLC Structure: 0805 chip size, 22.5 layers, 18 micron dielectric thickness

| Sample | $BaTiO_3$ wt % | Firing Condition | Density g/cm³ | Dielectric K | % D.F. | Breakdown V/mil | TCC % -55 C. | 85 C. | 125 C. | IR (R × C Product) 150 V, 125 C. 24 Hrs. | 100 Hrs. | Comments |
|---|---|---|---|---|---|---|---|---|---|---|---|---|
| LT-1030 | 97.0 | 965° C. | 5.84 | 3500 | 1.24 | 2246 | −5.4 | −8.6 | −9.5 | 450 | 290 | .1% $MnCO_3$, 0.1 $Co_3O_4$ |
| LT-1065 | 96.95 | 965° C. | 5.73 | 3200 | 1.12 | 1900 | −5.1 | −8.6 | −8.5 | 300 | 240 | 0.15% $MnCO_3$, 0.1 $Co_3O_4$ |
| LT-1067 | 96.90 | 965° C. | 5.72 | 3000 | 1.03 | 2600 | −4.5 | −8.3 | −7.1 | 145 | 116 | 0.20% $MnCO_3$, 0.1 $Co_3O_4$ |
| LT-1068 | 96.85 | 965° C. | 5.66 | 2750 | 0.77 | 2750 | −7 | −7.9 | −5.4 | 50 | 50 | .25% $MnCO_3$, 0.1 $Co_3O_4$ |
| LT-940 | 96.95 | 950° C. | 5.70 | 2900 | 1.0 | 2600 | −5.3 | −6.3 | −4.1 | 75 | 54 | 0% $Co_3O_4$, .25% $MnCO_3$ |
| LT-1005* | 97.05 | 965° C. | 5.68 | 3175 | 1.42 | 2750 | −8.3 | −11. | −15.0 | 400 | 400 | 0.10% $MnCO_3$, 0.15% $Co_3O_4$, 0.9 w % Flux |

*Note:
Flux content of LT-1005 was 0.9 wt. %

In the above referenced U.S. patent application Ser. No. 10/036,205, it was shown that a 0.20 to 0.25 $MnCO_3$ addition is required to achieve good stable insulation resistance ("I.R.") over a long period at elevated voltage and temperature. However, the downside of that concentration of $MnCO_3$ was a slight reduction in dielectric constant and lower insulation resistance. We have discovered that a partial substitution of the $MnCO_3$ by $Co_3O_4$ has significantly increased the I.R. and resulted in a dielectric constant near 3500 with good fired density, as shown in Examples LT-1030 having 0.1 wt % $MnCO_3$ and 0.1 wt % $Co_3O_4$, and LT-1088 of Table 9.

In Table 7, the effect of substitution of $Ta_2O_5$ for $Nb_2O_5$ is shown for a preferred embodiment of the ceramic powder. Example LT-1157 shows the effect of equivalent molar substitution of $Ta_2O_5$ for $Nb_2O_5$.

TABLE 7

Replacement of $Nb_2O_5$ by $Ta_2O_5$
Base Additive Composition in w %: 1.0 Flux, 0.1 $MnCO_3$, 0.8 $Gd_2O_3$, 0.1 Ag, 0.1 $Ho_2O_3$, 0.1 $Co_3O_4$
Internal Electrode: 90/10
MLC Structure: 0805 chip size, 10.5 layers, 18 micron dielectric thickness

| | | | | | | Dielectric | TCC % | | | IR (R × C Product) 150 V, 125 C. | | |
|---|---|---|---|---|---|---|---|---|---|---|---|---|
| Sample | $BaTiO_3$ wt % | Firing Condition | Density g/cm³ | K | D.F. | Breakdown V/mil | −55 C. | 85 C. | 125 C. | 24 Hrs. | 100 Hrs. | Comments |
| LT-1157 | 96.20 | 950° C. | 5.77 | 3330 | 1.44 | 3300 | −8.5 | −12.7 | −13.9 | 825 | 825 | 1.6 w % $Ta_2O_5$ |

TABLE 8

Effect of Ag, NiO, CuO Additions
Base Additive Composition in w %: 1.0 $Nb_2O_5$, 1.0 Flux, 0.1 $MnCO_3$, 0.8 $Gd_2O_3$, 0.1 $Co_3O_4$
MLC Structure: 0805 chip size, 10.5 layers, 18 micron dielectric thickness

| | | | Ag/Pd | | | | Dielectric | TCC % | | | IR (R × C Product) 150 V, 125 C. | | |
|---|---|---|---|---|---|---|---|---|---|---|---|---|---|
| Sample | $BaTiO_3$ wt % | Firing Condition | Internal Electrode | Density g/cm³ | K | D.F. | Breakdown V/mil | −55 C. | 85 C. | 125 C. | 24 Hrs. | 100 Hrs. | Comments |
| LT-1092 | 96.9 | 940° C. | 90/10 | 5.80 | 3425 | 1.28 | 2875 | −6.7 | 8.7 | 9.2 | 750 | 750 | 0.1% Ag |
| LT-1106 | 96.7 | 950° C. | 90/10 | 5.80 | 3400 | 1.14 | 2800 | −7.4 | −9.1 | −9.2 | 825 | 825 | 0.3% Ag |
| LT-1107 | 96.9 | 965° C. | 90/10 | Porous | N/A | N/A | N/A | N/A | N/A | N/A | N/A | N/A | 0.1% NiO |
| LT-1102 | 96.7 | 950° C. | 90/10 | 5.73 | 3340 | 1.16 | 2750 | −10.1 | −10.9 | −14.1 | 91 | 25 | 0.3% CuO |

As shown in Table 8, the effect of the addition of silver, nickel oxide and copper oxide is shown in a MLC that reinforces the results of those additives in a monolayer capacitor as shown in Table 5. Examples LT-1092 and LT-1106 show the effects of Ag additions on the overall properties of the MLC, even with an addition of up to 0.3 wt %. Both examples gave good properties, including accelerated life test at 150V, 125° C. for 100 hours. Example LT-1102 shows the addition of 0.3 wt. % CuO. Although acceptable properties were achieved, there was some evidence of a decrease in I.R. after 100 hours on life test. On the other hand, the addition of 0.1 wt. % NiO shown in example LT-1107 produced an unacceptable, porous microstructure, even when fired at 965° C.

Table 9 shows a preferred composition as a result of the above described extensive experimentation. Example LT-1088 describes the properties of MLC chips with 95 wt % silver and 5 wt % palladium electrodes. Example or sample LT-1172 describes the properties of MLC chips with 100 wt % silver electrodes.

TABLE 9

Preferred Additive Composition in wt %
0.8 $Gd_2O_3$, 1.0 Flux, 1.0 $Nb_2O_5$, 0.1 $Co_3O_4$, 0.1 $MnCO_3$, 0.1 Ag
MLC Structure: 0805 chip size, 10.5 layers, 18 micron dielectric thickness

| | | | | | | Dielectric | TCC % | | | IR (R × C Product) 150 V, 125 C. | | | |
|---|---|---|---|---|---|---|---|---|---|---|---|---|---|
| Sample | Firing Condition | Batio Wt. % | Density g/cm³ | K | D.F. | Breakdown V/mil | −55 C. | 85 C. | 125 C. | 24 Hrs. | 100 Hrs. | 400 Hrs. | Comments |
| LT-1088 | 940° C. | 96.9 | 5.80 | 3500 | 1.25 | 3000 | −6.0 | −8.9 | −9.0 | 750 | 450 | 450 | 95 Ag/5 Pd Electrode |
| LT-1172 | 900° C. | 96.8 | 5.71 | 3200 | 1.30 | 3200 | −4.1 | −7.6 | −4.2 | 800 | 800 | | 100 Ag Electrode, 0.1% $Ho_2O_3$ added |

As is apparent, the above described experimentation has resulted in a high dielectric constant, very low fired X7R ceramic powder for a capacitor with significantly enhanced characteristics. In particular, it has been determined that not only the additive gadolinium oxide, but other additives including rare earth oxide combinations, yttrium oxide, or rare earth oxide and yttrium oxide combinations, achieve enhanced performance, provided the rare earth ions of the combination of rare earth oxides, yttrium ions, or ions of a combination of rare earth oxide and yttrium oxide have an average ionic radius of about 0.97 angstroms ("A°"). (For purposes herein, the phrase "about 0.97 A° includes plus or minus 20% of 0.97 A° as given by "Ahrens".) That is shown best in example 02-182D in Table 1 where a combination of 66% dysprosium oxide ($Dy_2O_3$) and 34% neodymium oxide ($Nd_2O_3$) produces an average ionic radius of the plus 3 charged rare earth ions of about 0.97 A°. The ionic radius of Dy+3 is 0.92, and the ionic radius of Nd+3 is 1.04, so that for a combination of 66% Dy+3 and 34% Nd+3, the average ionic radius of the plus 3 rare earth ions is about 0.97 A°. The potential rare earth oxides may include oxides of all known rare earth elements listed on the periodic table of the elements ranging between and including all those elements having atomic numbers 57 and 71, as well as yttrium (atomic number 39). In order to determine if any combination of rare earth ions will result in an average ionic radius of about 0.97 A°, it is only necessary to apply the known ionic radius of the rare earth ions to the following Formula: $x(R_A)+Y(R_B)=0.97\pm20\%$ Where $R_A$ is the ionic radius of the large cation that may substitute on the barium lattice site and $R_B$ is the ionic radius of the small cation that may substitute on the titanium lattice site. X represents the weight % of $R_A$ additive relative to the total rare earth addition and Y represents the weight % of $R_B$ additive relative to the total rare earth addition.

Additionally, it has been demonstrated that an optimal wt % of the BLBS flux is about 1 wt %; that adjusting the content of the lithium silicate in the BLBS to about 50 molar % $Li_2SiO_4$, 25% $BaO.B_2O_3$, 25 molar % $3BaO.B_2O$ appeared to give the optimum properties, as shown in Example 02-26A in Table 4. Addition of up to 0.3 wt % Ag further enhances performance as seen in Table 5, Example 02-171C, and that addition of up to 0.3 wt % CuO also enhances performance. Moreover, partial substitution of the $MnCO_3$ by $Co_3O_4$ has significantly increased the I.R. and resulted in a dielectric constant near 3,500 with a good fired density, as shown in Example LT-1030 having 0.1 wt % $MnCO_3$ and 0.1 wt % $Co_3O_4$ in Table 6. Useful properties were also obtained by the substitution of $Ta_2O_5$ for $Nb_2O_5$, as shown in Example LT-1157 of Table 7 for an equivalent molar substitution of $Ta_2O_5$ for $Nb_2O_5$. That substitution, and the substitution of rare earth oxides and the addition of silver and copper were shown for both a monolayer capacitor, as well as in MLC embodiments.

With respect to the use of combinations of rare earth oxides, wherein the average ionic radius of the ions of the combination of rare earth oxides is about 0.97 A°, it is theorized by the inventors herein that when the combination of rare earth oxides is sintered with the barium titanate, by exhibiting amphoteric qualities the larger of the combination of rare earth ions will occupy lattice sites in the barium components of the core shell, and the smaller rare earth ions will occupy lattice sites in the titanate components of the core shell of the resulting complex molecules of the ceramic powder.

Further experimentation has demonstrated a preferred method of making the above described preferred dielectric ceramic powder. It is known that good quality ceramic capacitors have been made by simply batching all the described non-barium titanate minor additives with barium titanate during preparation of a capacitor paint slurry. However, the inventors herein have determined that further improvements in the properties and lowering of the sintering temperature were achieved when all the minor additives are mixed separately and pre-reacted at relatively low temperature. Preparation of the ceramic powder by this enhanced pre-reacting method includes the steps of: intensively wet milling the minor additives including $Nb_2O_5$ the described additives of rare earth and/or yttrium oxides, BLBS flux, Ag, $MnCO_5$ and $Co_3O_4$ to achieve a particle size below 1.0 micron and preferably around 0.5 to 0.6 microns; drying the wet milled minor additives at about 150° C.; then, granulating and mildly calcining the dried, wet milled mixture of minor additives at about 500 to 600° C.; then mixing the calcined minor additives with the barium titanate. It has been discovered that this method of making the enhanced ceramic powder provides for a powder with improved performance characteristics because complex intermediate phases are formed by the described pre-reacting process.

In determining such enhanced performance as a result of the pre-reacting method of making the ceramic powder, powder x-ray diffraction before and after calcinations clearly revealed that at least the $Nb_2O_5$ was reacted with certain flux components. It is believed that such a pre-reacting step of the additives on a submicron scale will insure better homogeneity of the minor ingredients when added to the $BaTiO_3$ to form the final composition of the ceramic powder. Multilayer ceramic samples made from the same ratio of the minor prereacted mixture, as compared to a non-prereacted mixture of the same composition, showed enhanced physical and electrical properties.

Another aspect of this invention includes a method for making a multilayer ceramic capacitor body that satisfies X7R performance characteristics that includes the steps of forming a slurry of the above described dielectric ceramic start powder mixture by a dispersion of the mixture in a binder-solvent-dispersion system; preparing layers of the slurry; drying the layers; forming a stack of a plurality of the layers and interleaving patterned films of the described, low palladium content silver-palladium electrode ink between successive adjacent pairs of layers; and then heating to mature the stack of layers by sintering in open air at a temperature of between 875° C. to 1,025° C. for between 3 to 5 hours to produce a dense ceramic capacitor body with buried electrodes.

The multilayer ceramic capacitor made by that method demonstrates the aforesaid favorable X7R performance characteristics of dielectric constant ("K") greater than 2,500, a smooth temperature coefficient of capacitance ("TCC") wherein the K will be within +/−15% between −55° C. to 125° C., a dissipation factor ("DF") of less than 2.5 percent, an insulation resistance greater than 100 ohms-farads at 125° C., and long term stability during a life test at elevated temperatures and voltages.

Another aspect of the present invention is a multilayer ceramic capacitor 10 that satisfies the aforesaid X7R characteristics having at least one electrode 14 buried within the body 12 of the capacitor 10, and an external terminal 18 connected to at least one electrode 14, wherein the capacitor body comprises at least ninety weight percent essentially pure barium titanate powder having an average particle size of from 0.2 to 1.2 microns; from 0.2 to 2.5 weight percent of barium lithium borosilicate ("BLBS") flux; from 0.1 to 0.3 weight percent of $MnCO_3$; a grain growth inhibitor such as niobium oxide or a niobate compound yielding 0.4 to 1.50 weight percent $Nb_2O_5$; and, 0.4 to 1.2 weight percent of an additive selected from the group consisting of a rare earth oxide, a combination of rare earth oxides, yttrium oxide, or a combination of rare earth oxides and yttrium oxide, such that ions of the rare earth oxide, ions of the combination of rare earth oxides, ions of the yttrium oxide, or ions of the combination of yttrium oxide and rare earth oxides have an average ionic radius of about 0.97 A°. Further embodiments of the multilayer capacitor 10 include the addition and substitution of minor additives described above.

While the present invention has been described and illustrated with respect to the specified examples and embodiments, it is to be understood that the invention is not to be limited to those described examples or embodiments. For example, the disclosed method of making a capacitor from the enhanced embodiments describes "forming a slurry" of the powder by "a dispersion of the mixture in a binder-solvent-dispersion system". It is to be understood, however, that "forming a slurry" of the powder may be accomplished by any means known in the art.

Additionally, the described "grain growth inhibitor" of a "niobium oxide or a niobate compound yielding 0.4 to 1.50 weight percent $Nb_2O_5$" may also include the grain growth inhibitor disclosed in the aforesaid U.S. patent application Ser. No. 10/036,205. That grain growth inhibitor is selected from the group consisting of niobium compounds $Nb_2O_5$, $BaNb_2O_6$, $CaNb_2O_6$, $MgNb_2O_6$, $LiNbO_3$, or mixtures thereof such that a weight percent of $Nb_2O_5$ ranges from 0.4 wt % to 1.50 wt %, or tantalum compounds, or mixtures thereof, such that a weight percent of $Ta_2O_5$ ranges from 0.66 wt % to 2.50 wt %, or a mixture of molar equivalents of the niobium and tantalum compounds.

Accordingly, reference should be made to the following claims rather than the foregoing description and examples to determine the scope of the invention.

What is claimed is:

1. A dielectric ceramic start powder comprising:
   a. at least ninety weight percent essentially pure barium titanate powder having an average particle size of from 0.2 to 1.2 microns;
   b. from 0.2 to 2.5 weight percent of a flux selected from the group consisting of barium lithium borosilicate flux, zinc lithium borosilicate flux, and mixtures thereof;
   c. from 0.05 to 0.3 weight percent of $MnCO_3$;
   d. a grain growth inhibitor selected from the group consisting of niobium compounds $Nb_2O_5$, $BaNb_2O_6$, $CaNb_2O_6$, $MgNb_2O_6$, $LiNbO_3$, and mixtures thereof such that a weight percent of $Nb_2O_5$ ranges from 0.4 wt % to 1.50 wt %, and tantalum compounds, and mixtures thereof, such that a weight percent of $Ta_2O_5$ ranges from 0.66 wt % to 2.50 wt %, and a mixture of molar equivalents of the niobium and tantalum compounds; and,
   e. from 0.4 to 1.4 weight percent of an additive selected from the group consisting of a rare earth oxide, yttrium oxide, a combination of rare earth oxides, and a combination of yttrium oxide and rare earth oxides, such that ions of the rare earth oxide, ions of the yttrium oxide, ions of the combination of rare earth oxides, and ions of the combination of rare earth oxides and yttrium oxide have an average ionic radius of about 0.97 angstroms.

2. The dielectric ceramic start powder of claim 1, wherein the flux is about 1.0 weight percent of the barium lithium borosilicate flux.

3. The dielectric ceramic start powder of claim 1, further comprising from 0.01 to 0.4 weight percent silver.

4. The dielectric ceramic start powder of claim 1, wherein the barium lithium borosilicate flux is about 50 molar % $Li_4SiO_4$, 25 molar % $BaO.B_2O_3$, and 25 molar % $3BaO.B_2O$.

5. The dielectric ceramic start powder of claim 1, further comprising from 0.01 to 0.4 weight percent copper.

6. The dielectric ceramic start powder of claim 1, further comprising about 0.05 to 0.3 weight percent $MnCO_3$ and about 0.01 to 0.25 weight percent $Co_3O_4$.

7. The dielectric ceramic start powder of claim 1, wherein the grain growth inhibitor consists essentially of $Ta_2O_5$.

8. The dielectric ceramic start powder of claim 1, wherein the additive is a combination of rare earth oxides including about 0.2 weight percent $Ho_2O_3$ and 0.8% $Gd_2O_3$, and about 0.1 weight percent silver.

9. A method of manufacturing a dielectric ceramic start powder, comprising the steps of:
   a. intensively wet milling from 0.2 to 2.5 weight percent of barium lithium borosilicate flux, from 0.05 to 0.3 weight percent of $MnCO_3$, from about 0.01 to 0.25 weight percent $Co_3O_4$, a grain growth inhibitor selected from the group consisting of niobium compounds $Nb_2O_5$, $BaNb_2O_6$, $CaNb_2O_6$, $MgNb_2O_6$, $LiNbO_3$, and mixtures thereof such that a weight percent of $Nb_2O_5$ ranges from 0.4 wt % to 1.50 wt %, and tantalum compounds, and mixtures thereof, such that a weight percent of $Ta_2O_5$ ranges from 0.66 wt % to 2.50 wt %, and a mixture of molar equivalents of the niobium and tantalum compounds; and, from 0.4 to 1.2 weight percent of an additive selected from the group consisting of a rare earth oxide, yttrium oxide, a combination of rare earth oxides, and a combination of yttrium oxide and rare earth oxides, such that ions of the rare earth oxide, ions of the yttrium oxide, ions of the combination of rare earth oxides, and ions of the combination of rare earth oxides and yttrium oxide have an average ionic radius of about 0.97, to achieve a particle size below 1.0 micron;
   b. drying the wet milled compounds at about 150° C.; then,
   c. granulating and mildly calcining the dried, wet milled compounds at about 500° C. to 600° C.; and,
   d. then mixing the calcined, dried, wet milled compounds with at least ninety weight percent essentially pure barium titanate powder having an average particle size of from 0.2 to 1.2 microns.

10. The method of manufacturing a dielectric ceramic start powder of claim 9, comprising the further step of wet milling between 0.01 to 0.4 weight percent silver with the compounds being wet milled.

11. A method of making a multilayer ceramic capacitor that satisfies X7R capacitor performance characteristics, comprising the steps of:
   a. preparing a mixture of the dielectric ceramic start powder of claim 1;
   b. mildly calcining the dielectric ceramic start powder at about 450° C. to about 500° C. to obtain a dielectric start powder comprised of agglomerates of the mixture of start powders wherein each of the agglomerates has essentially the same compositional ratios as the start powder of the barium titanate, flux, $Nb_2O_5$, $MnCO_3$, $Co_3O_4$, and the additive of rare earth oxide, yttrium oxide, combination of rare earth oxides, or combination of yttrium oxide and rare earth oxides;
   c. forming a slurry of the calcined ceramic powder;
   d. preparing layers of the slurry;
   e. forming a stack of a plurality of the layers and interleaving at least one silver or silver-palladium electrode between adjacent layers; and
   f. heating to mature the stack of layers by sintering in open air at a temperature of between 875° C. to 1,025° C. to produce a multilayer ceramic capacitor body with at least one buried electrode.

12. The method of making the multilayer ceramic capacitor of claim 11, comprising the further step of mixing with the dielectric ceramic start powder 1.0 weight percent of the barium lithium borosilicate flux before the mildly calcining step.

13. The method of making the multilayer ceramic capacitor of claim 11, comprising the further step of mixing with the dielectric ceramic start powder from 0.01 to 0.4 weight percent silver before the mildly calcining step.

14. The method of making the multilayer ceramic capacitor of claim 11, wherein the silver-palladium electrode comprises 85 weight percent or more of silver.

15. A multilayer ceramic capacitor that satisfies X7R performance characteristics having at least one electrode buried within a body of the capacitor, and an external terminal connected to at least one electrode, the body comprising:

a. at least ninety weight percent essentially pure barium titanate powder having an average particle size of from 0.2 to 1.2 microns;

b. from 0.2 to 2.5 weight percent of barium lithium borosilicate flux;

c. from 0.05 to 0.3 weight percent of $MnCO_3$;

d. a grain growth inhibitor selected from the group consisting of niobium compounds $Nb_2O_5$, $BaNb_2O_6$, $CaNb_2O_6$, $MgNb_2O_6$, $LiNbO_3$, and mixtures thereof such that a weight percent of $Nb_2O_5$ ranges from 0.4 wt % to 1.50 wt %, and tantalum compounds, and mixtures thereof, such that a weight percent of $Ta_2O_5$ ranges from 0.66 wt % to 2.50 wt %, and a mixture of molar equivalents of the niobium and tantalum compounds; and, e. from 0.4 to 1.2 weight percent of an additive selected from the group consisting of a rare earth oxide, yttrium oxide, a combination of rare earth oxides, and a combination of yttrium oxide and rare earth oxides, such that ions of the rare earth oxide, ions of the yttrium oxide, ions of the combination of rare earth oxides, and ions of the combination of rare earth oxides and yttrium oxide have an average ionic radius of about 0.97 angstroms.

16. The multilayer ceramic capacitor of claim 15, wherein the body further comprises about 1.0 weight percent of the barium lithium borosilicate flux.

17. The multilayer ceramic capacitor of claim 15, wherein the body further comprises from 0.01 to 0.4 weight percent silver and from 0.01 to 0.25 weight percent $Co_3O_4$.

18. The multilayer ceramic capacitor of claim 15, wherein oxides within the barium lithium borosilicate flux are in a mole percent range of BaO from 16.25 to 46.25 mole percent, $Li_2O$ from 20.1 to 46.9 mole percent, $B_2O_3$ from 8.75 to 28.75 mole percent, and $SiO_2$ from 9.9 to 23.1 mole percent.

19. The multilayer ceramic capacitor of claim 15, wherein the body further comprises from 0.01 to 0.4 weight percent copper.

20. The multilayer ceramic capacitor of claim 15, wherein the body further comprises about 0.1 weight percent $MnCO_3$ and about 0.1 weight percent $Co_3O_4$.

* * * * *